United States Patent [19]

Shaio

[11] Patent Number: 5,299,260
[45] Date of Patent: Mar. 29, 1994

[54] TELEPHONE CALL HANDLING SYSTEM

[75] Inventor: Jack Shaio, Cambridge, Mass.

[73] Assignee: Unifi Communications Corporation, Billerica, Mass.

[21] Appl. No.: 99,809

[22] Filed: Jul. 29, 1993

Related U.S. Application Data

[63] Continuation of Ser. No. 615,918, Nov. 20, 1990, abandoned.

[51] Int. Cl.$^5$ ............................................. H04M 5/06
[52] U.S. Cl. ..................................... 379/265; 379/266; 379/210
[58] Field of Search ............... 379/265, 266, 211, 248, 379/201, 309, 210, 212, 214, 242, 142

[56] References Cited

U.S. PATENT DOCUMENTS

| | | | |
|---|---|---|---|
| 4,277,649 | 7/1981 | Sheinbein | 379/246 |
| 4,400,587 | 8/1983 | Taylor et al. | 379/265 |
| 4,510,351 | 4/1985 | Costello et al. | |
| 4,694,483 | 9/1987 | Cheung | 379/265 |
| 4,723,273 | 2/1988 | Diesel et al. | 379/211 |
| 4,757,529 | 7/1988 | Glapa et al. | |
| 4,763,353 | 8/1988 | Canale et al. | 379/265 |
| 4,879,743 | 11/1989 | Burke et al. | 379/142 |
| 4,893,325 | 1/1990 | Pankonen et al. | 379/210 |
| 4,949,373 | 8/1990 | Baker, Jr. et al. | 379/266 |
| 4,964,155 | 10/1990 | Pinard | 379/266 |
| 5,008,930 | 4/1991 | Gawrys et al. | 379/210 |
| 5,020,095 | 5/1991 | Morganstein et al. | 379/266 |
| 5,023,868 | 6/1991 | Davidson et al. | 379/211 |
| 5,025,468 | 6/1991 | Sikand et al. | 379/266 |
| 5,027,384 | 6/1991 | Morganstein | 379/67 |
| 5,029,196 | 7/1991 | Morganstein | 379/67 |
| 5,036,535 | 7/1991 | Gechter | 379/210 |

OTHER PUBLICATIONS

Aspect Telecommunications Corporation product specification for Aspect Call Center, (1988).
Teknekron Infoswitch Corportion, "ISD/ACD Infoswitch Digital Automatic Call Distributor", (1988).

Primary Examiner—James L. Dwyer
Assistant Examiner—Ahmad F. Matar
Attorney, Agent, or Firm—Fish & Richardson

[57] ABSTRACT

A system for automatically handling incoming telephone calls. The system receives an incoming call and telephony information about the incoming call, and, using a call discrimination subsystem and based on the telephony information, assigns control of the call to one of a plurality of possible application programs. At least one application program includes queries for obtaining further information about the call and returns control of the call to the call discrimination subsystem to reassign the call based on the telephony information and the further information. The system selects an application program by comparing telephony information about the call with telephony digit patterns that correspond to different types of telephony information and that have been input by a user to be associated with an application program. Other features of the system are directed to selecting agents to handle incoming calls based on a list of quantitative agent performance values that are continuously updated by a monitoring system. In some cases, multiple, user-selectable lists are maintained. Also, offset values are used to modify the agent performance values when selecting an agent. When an agent is selected, the system provides on command of a plurality of possible commands regarding the handling of the incoming call depending upon which agent has been selected. The system also counts the number of incoming calls and handles a preselected number of the calls in a different manner than the remainder of the calls.

49 Claims, 7 Drawing Sheets

Field Value, Offset for Agent

| Field | Agent A | Agent B | Agent C | Agent D |
|---|---|---|---|---|
| avail | 320, 0 | 170, 0 | 352, 0 | 270, 0 |
| sales | 1452, 0 | 1290, 0 | 1732, 500 | 1100, 0 |
| rank | 11, 0 | 10, 0 | 4, 0 | 8, 0 |
| calls/hr | 17, 0 | 19, 0 | 7, 0 | 22, 2 |

Figure 4

Agent Order Based upon Selected Field

| Field | first | second | third | fourth |
|---|---|---|---|---|
| avail | C | A | D | B |
| sales | A | B | C | D |
| rank | A | B | D | C |
| calls/hr | D | B | A | C |

Figure 5

| Pool | Ranking criterion / Agent offset |
|---|---|
| Service | • Available agents queued by longest waiting time<br>• Ten second extra wait for trainees |
| Sales | • Available agents queued by value of sales<br>• Additional advantage based on yesterday's sales |
| Support | • Available agents queued by number of calls answered<br>• Equal treatment for everyone |

Figure 6 routing program with
before/after statements:
.
.
AddAgentPool SALES
  before
    <command b1>
    <command b2>
    <command b3>
  .
  after
    <command a1>
    <command a2>
    <command a3>
  .
;/* end of AddAgentPool
statement */
Figure 8
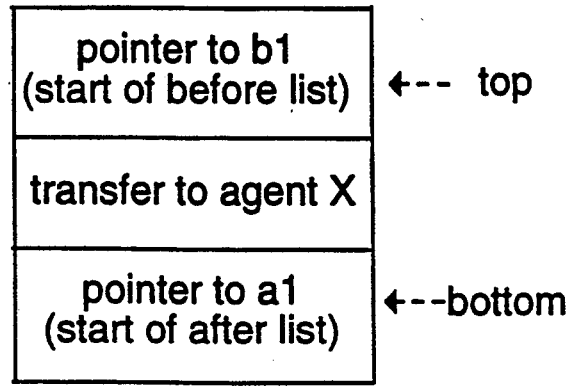
Figure 9
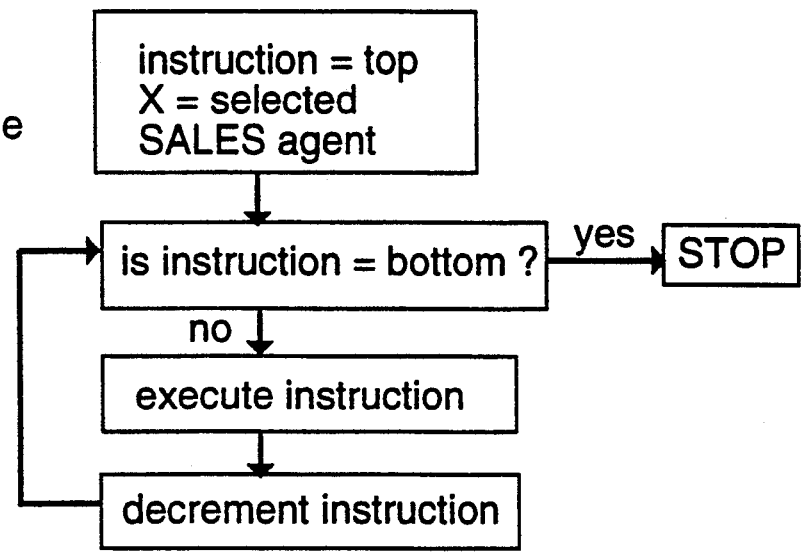
Figure 10

TELEPHONE CALL HANDLING SYSTEM

This is a continuation of application Ser. No. 07/615,918, filed Nov. 20, 1990, and abandoned.

BACKGROUND OF THE INVENTION

The invention relates to systems for automatically handling incoming telephone calls.

An automatic call distributor (ACD) is a type of system for automatically handling incoming telephone calls. An ACD is designed to efficiently route calls, such as toll-free "800" calls, to agents in telemarketing and service inquiry centers and provides specialized real-time call management and report generation capabilities. An ACD is a unique communications product in that it directly supports the operation and management of a customer's business. The ACD monitors the status of each agent and, when an incoming call is received, selects the agent best able to handle a particular marketing or service request. The ACD also provides detailed reporting on the performance of the agents in their tasks, reporting such statistics as the number of calls handled and the time spent in various stages of call handling.

ACDs can have different application programs to handle calls in different ways, e.g., one application program to handle sales calls and a different application program to handle service calls.

SUMMARY OF THE INVENTION

In one aspect, the invention features in general automatically handling incoming telephone calls by a call discrimination subsystem that receives telephony information about the incoming telephone calls (e.g., number dialed, incoming line, number of caller) and assigns the incoming telephone call to one of a plurality of possible application programs to handle the call based upon the telephony information. At least one of the application programs includes queries for obtaining further information about the incoming call (e.g., in response to questions to the caller by a voice response unit or customer information on file) and thereafter the incoming call is returned to the subsystem to reassign the call based upon the original telephony information and the further information that was obtained.

In another aspect, the invention features, in general, automatically handling incoming telephone calls by comparing telephony information about the call with telephony digit patterns that have been input by a user and are associated with a respective application program. The digit patterns include patterns for plural fields corresponding to different types of telephony information. The call discrimination subsystem includes a translation module that translates the patterns into assignment logic for assigning the incoming calls. The translation module treats all patterns in the same field as logical OR operations and patterns in different fields as logical AND operations in creating the assignment logic. The assignment logic created by the translation module includes a global name table that lists a global application index (GAI) for each possible application program, a global-to-local application table (GLAT) for each field, and a field matrix (FM) for each field; the GLAT matches each GAI to local application indexes (LAI) that each identify a telephony pattern associated with an application program; the FM includes sets of pattern digit values along one axis and pattern digit positions along another axis and sets of LAI values at the intersections of digit values and digit positions.

In another aspect, the invention features in general selecting agents to handle incoming calls by maintaining a list of quantitative agent performance values that are continuously updated by a monitoring system. E.g., the total sales made by each agent can be monitored so that the call can be first directed to the agent making the most sales. The system could also monitor the average time spent by each agent per call and direct the call to the agent having the lowest (or highest) average time values.

In another aspect, the invention features in general, selecting agents to handle incoming calls by maintaining a plurality of lists of quantitative selection values that correspond to different criteria for agent selection, and providing a means for the user to select which list, and thus which criterion, is employed in selecting agents. The criteria can include total sales made by each agent, an average time to handle each call by each agent, an agent performance rank assigned to each agent, and a waiting time list listing the amount of time each agent has been ready to receive a call.

In another aspect, the invention features in general automatically handling incoming calls by maintaining a list of quantitative agent selection values (not necessarily related to agent performance) and modifying the selection values based upon respective offset values assigned to the agents in order to obtain effective selection values for the agents. This gives the user flexibility in employing quantitative selection values, e.g., permitting the user to guarantee that a new agent is not receiving too many calls, even if he might be achieving high total sales or low times per call when selection values are based on one of these criteria.

In another aspect, the invention features automatically handling incoming telephone calls by a system that selects one agent of a plurality of agents to receive the call and provides one command of a plurality of possible commands regarding the handling of the incoming call depending upon which agent has been selected.

In preferred embodiments, the command can be a command to play a message to the caller, a command to communicate with an agent supervisor regarding the call, a command to obtain information from an external database and to send the information prior to connecting the incoming call, or a command to take some action after the agent has completed handling the incoming call and has been disconnected from the incoming call. The various commands can be entered by a user of the system using an interactive input device. The input device is adapted to input a list of agent pool identifiers and actions to be taken before connecting the incoming call to an agent in the indicated pool and actions to be taken after the incoming call has been disconnected from an agent in the indicated pool. The system translates the list into a list of pointers to instruction lists that provide the commands to cause the indicated actions.

In another aspect, the invention features in general automatically handling incoming telephone calls by a system that counts the number of incoming calls (or the number of incoming calls that have reached a specified step in the call handling process) and handles a portion of the total number of calls by a different method than the remainder of the calls. E.g., an agent supervisor can be connected to listen to a conversation between an agent and a caller making an incoming call; alternatively, the agent supervisor can be selected as the agent to receive an incoming call in order to sample the types of incoming calls, or different messages can be played to different incoming callers to evaluate the effectiveness of the messages.

Other advantages and features of the invention will be apparent from the following description of the preferred embodiment thereof and from the claims.

DESCRIPTION OF THE PREFERRED EMBODIMENT

Figure 2:
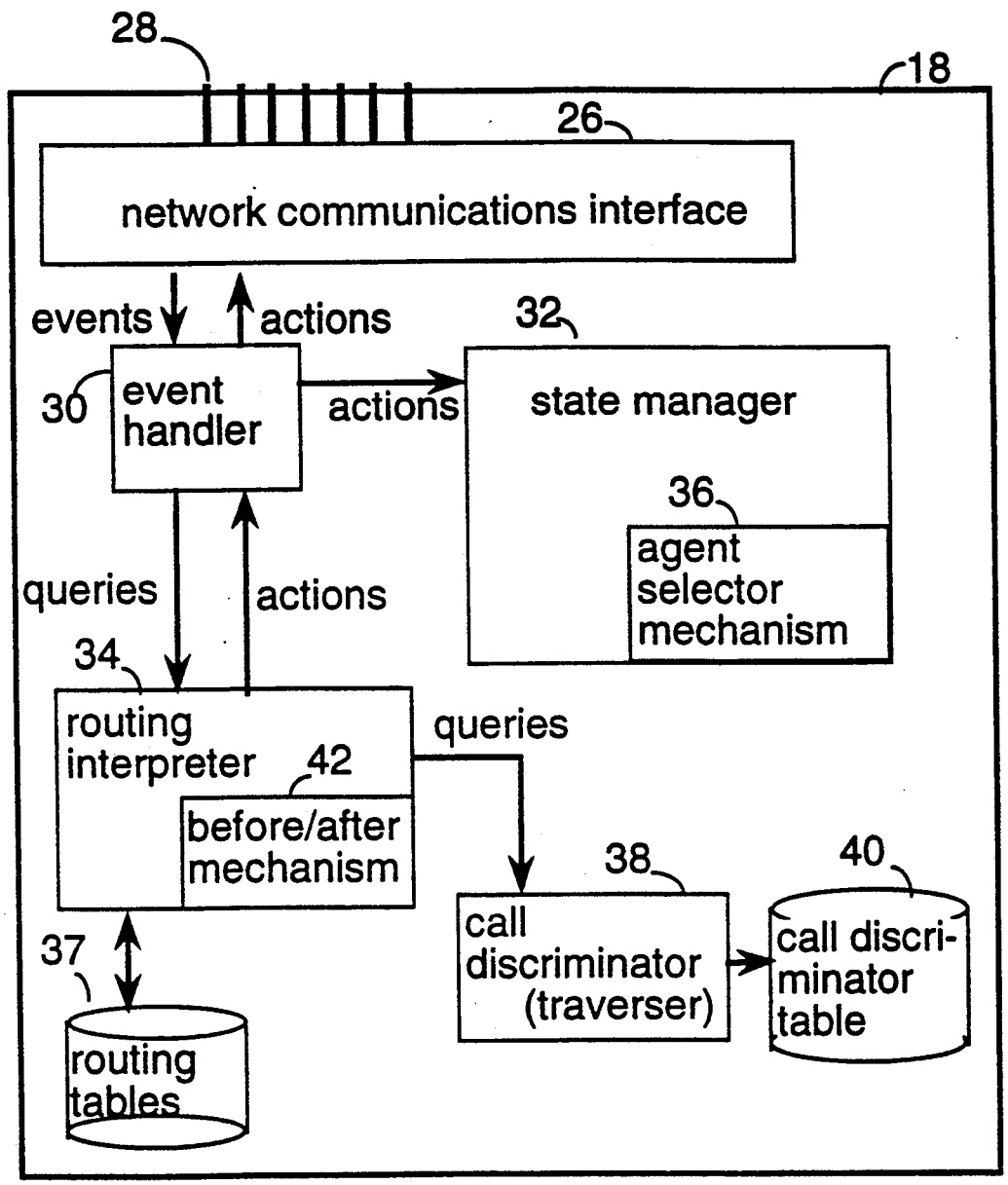
FIG. 2 is a block diagram of the software architecture used in a call router of the FIG. 1 automatic call handling system.

FIGS. 4, and 5 are tables illustrating the use of quantitative agent selection values by an agent selection mechanism of the FIG. 2 call router.

FIG. 6 is a table presenting different agent ranking criteria that could be used in the agent selection mechanism depending upon the type of agent pool.

Figure 7:
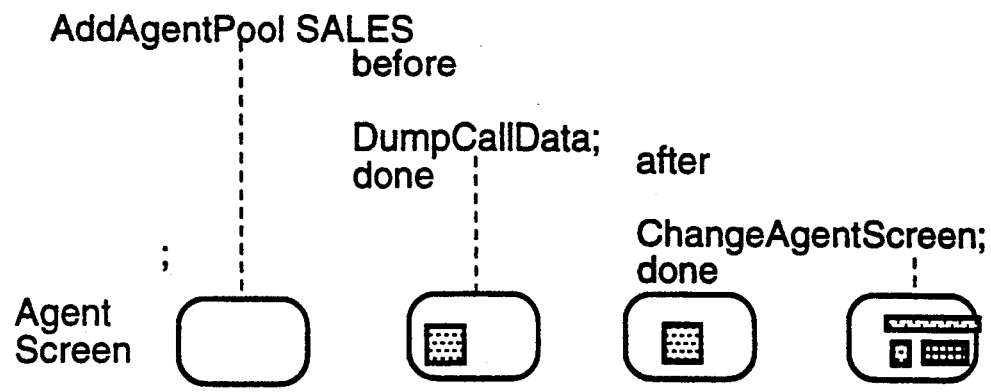

FIG. 7 is a diagram illustrating the effect of a before-/after mechanism of the FIG. 2 call router on a display screen of an agent station.

FIGS. 8 shows a fragment of a program containing before/after statements.

FIG. 9 shows a stack of pointers used to implement the FIG. 8 statements.

FIG. 10 is flow chart for executing the instructions indicated by the FIG. 9 stack of pointers.

STRUCTURE

Figure 1:
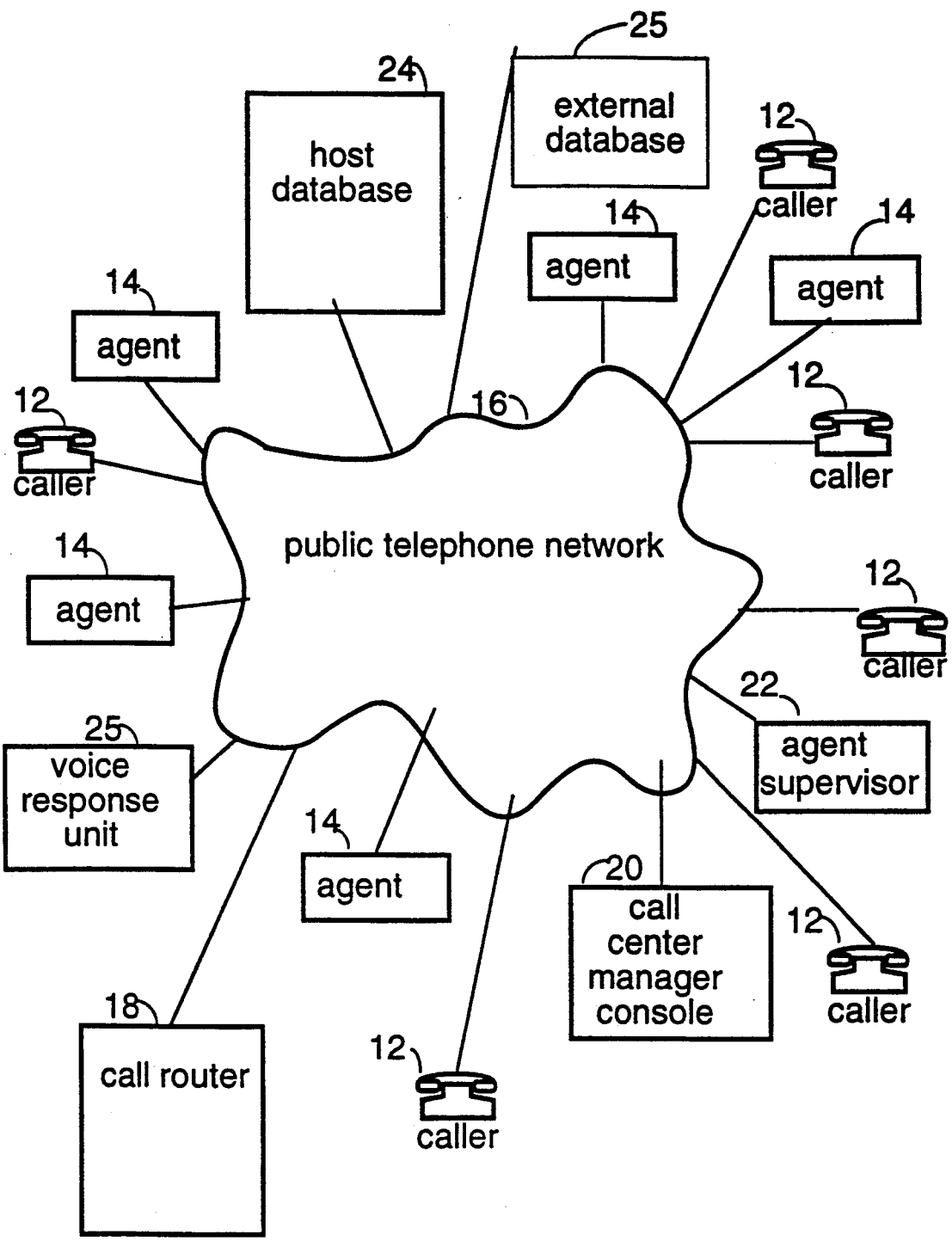
FIG. 1 is a block diagram of a system for automatically handling an incoming telephone call according to the invention.

Referring to FIG. 1, the various components of an automatic call handling system are shown. The call handling system distributes incoming calls from callers 12 to agent stations 14 that are connected to public telephone network 16. (In fact there would be a much larger number of both callers and agents.) The call handling system includes call router 18, call center manager module 20, agent supervisor station 22, host database 24, and voice response unit 25. These components and agent stations 14 are each connected to public telephone network 16 via a network service interface, which in the preferred embodiment is an integrated systems digital network (ISDN) interface. Call router 18 is used to cause network 16 to connect an incoming call of a caller 12 to one of the agent stations 14. Call router 18 selects the agent station 14 to receive an incoming call based upon user-selected criteria, including dynamically changing information as to agent performance, which is monitored by the system. Call center manager console 20 provides an interface for the system manager to input information to configure the operation of system (as is described in detail below) and to monitor the operation of the system. Agent supervisor station 22 is used to monitor the performance of agents by an agent supervisor. Host database 24 and external database 25 include business databases (e.g., order entry, customer information, service schedules) which are accessed by call router 18. The hardware platforms employed in the components of the call handling system and various control algorithms are as described U.S. Pat. No. 5,036,535 which is hereby incorporated by reference.

Referring to FIG. 2, software architecture for call router 18 is shown. Network communications interface 26 is connected to a plurality of incoming telephone lines 28 via a communications driver layer (not shown in FIG. 2). Network communications interface 26 feeds event handler 22, which tracks the system state as seen by call router 18 and filters incoming events to notify appropriate subprocessors. Event handler 30 feeds actions to state manager 32 and queries to routing interpreter 34 and receives actions from routing interpreter 34.

Three important subsystems of call router 18 are call discriminator 38 (used to determine which application program is to be used), agent selector mechanism 36 (used to select which agent should receive a call), and before/after mechanism 42 (used to control actions before and after connection of an incoming call to an agent). Call discriminator 38 receives queries from routing interpreter 34 and accesses call discriminator table 40. Agent selector mechanism 36 resides in state manager 32, and before/after mechanism 42 resides in routing interpreter 34, which accesses routing tables 37. The operation of call discriminator 38 and before/after mechanism 42 are user configurable by the system manager at call center manager console 20. The operation of agent selector mechanism 36 is user configurable by the system manager at call center manager console 20 or an agent supervisor at agent supervisor station 24.

Figure 3:
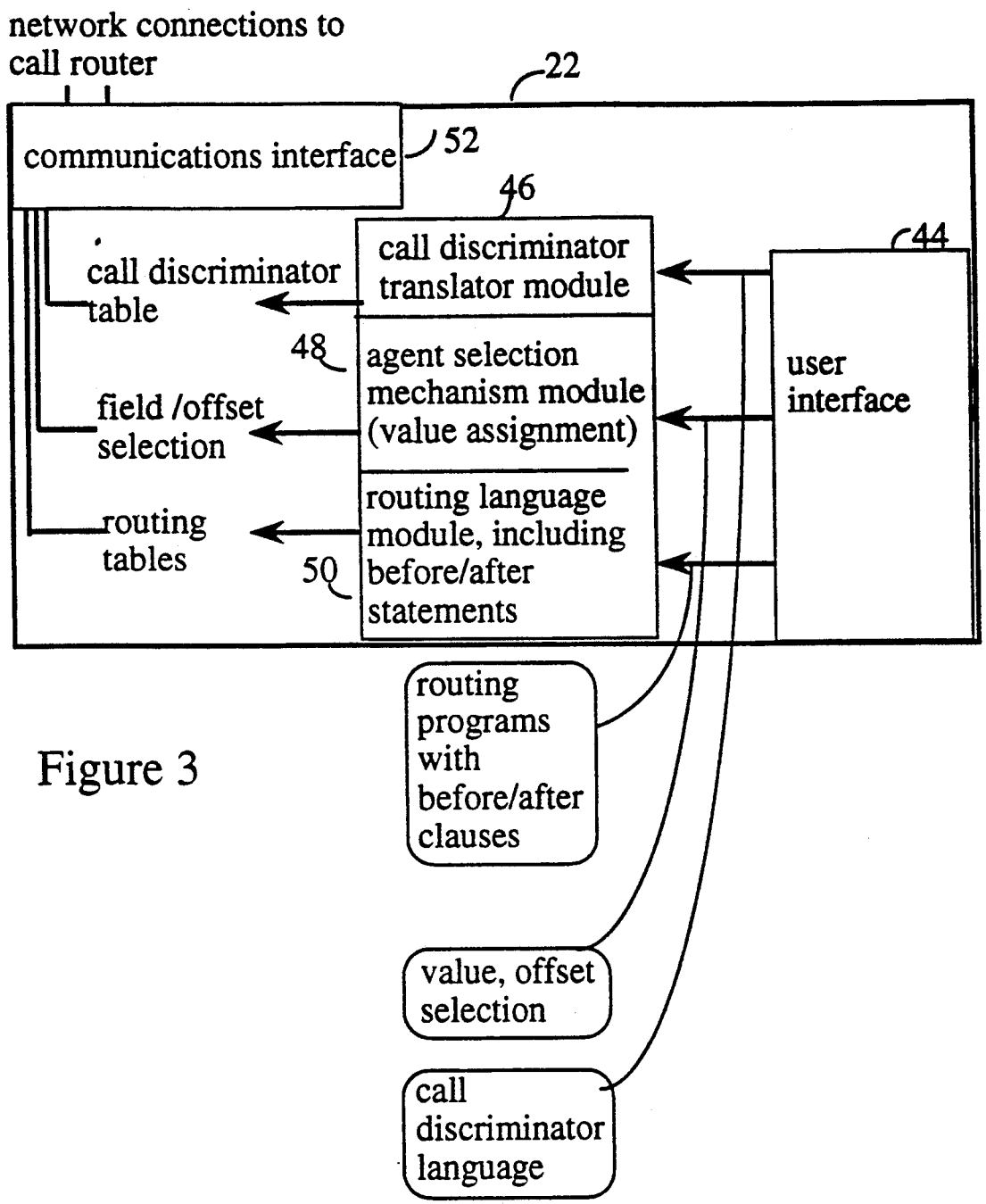
FIG. 3 is a block diagram of the software architecture for a call center manager control console employed in the, FIG. 1 system.

Referring to FIG. 3, call center manager console 20 includes interactive user interface 44 (e.g., a CRT and keyboard), which is used by the operator to enter information necessary to program the call discrimination, agent selection and before/after functions implemented by call router 18. The information is entered employing high-level, simplified languages, and translator modules 46, 48, 50 are adapted to convert the entries in the high-level languages into machine readable entries. In particular, call discriminator translator module 46 includes algorithms to convert telephony digit patterns, described in more detail below, into call discriminator table 40. Agent selector mechanism module 48 includes algorithms to convert value and offsets for quantitative agent selection criteria into a format used by agent selector mechanism 36. Agent selector module 48 can also reside in agent supervisor station 22, permitting the agent supervisor to control the agent selection criteria and offsets. Routing language module 50 includes algorithms to convert lists of before/after clauses (indicating actions to be taken before connecting a call to an agent and after the call has been completed) into pointers to instructions in routing tables 37. Console 20 also includes communications interface 52 for sending the outputs of modules 46, 48, 50 over public telephone network 16 to call router 18.

OPERATION

The general operation of call handling system will be described first, and then the user configuration and operation of the call discrimination, agent selection and before/after subsystems will be described in turn in detail.

When an incoming call is received by call router 18, a call record is established in memory in call router 18 to store data about the call that can be accessed by and added to by various processes in call router 18. In the initial stage of routing, routing interpreter 34 calls call discriminator 38 to determine which application program (e.g., sales or service or a particular sales or service application program) within routing interpreter 34 should be employed to handle the call. The selected application program is then used to continue processing, which generally includes identification of an agent pool or pools from which an agent can be selected to handle the call and adding entries identifying the pool and specifying actions to be taken during continued handling of the call to the call record. State manager 32 then adds the call to the queue for an agent pool, employing agent selector mechanism 36 to choose between available agents. When an available agent has been selected, the selected agent identification is added to the call record. Event handler 30 then takes the actions indicated in the call record, generally including transferring the incoming call to the selected agent by instructing network 16 to transfer the call to the selected agent station 14. Information regarding the calls and the status of agents is continuously transferred between call router 18 and agent stations 14 and other components of the call handling system over the X.25 network.

CALL DISCRIMINATION SUBSYSTEM

Call discriminator 38 accesses telephony information about an incoming telephone call (e.g., number dialed, incoming line, number of caller) in the call record and assigns the incoming telephone call to one of a plurality of possible application programs to handle the call based upon the telephony information. In assigning an application program, call discriminator 38 compares the telephony information associated with an incoming call with the digit patterns of telephony data associated with the various application programs in call discriminator table 40.

Call discriminator table 40 is created by information entered by the system manager into interactive input device 44 of call center manager console 20. Console 20 employs a simple programming language that hides logical operations from the system manager. Call discriminator translator module 46 in console 20 converts a user program written in simple language into machine-readable call discriminator table 40.

The system manager enters application selection information in the form of digit patterns for various fields of telephony information that are associated with application programs. The following fields are used in the preferred embodiment, but the system is expandable to any number of fields.

BRI: Basic Rate Interface is the number of the line 28 on which the call arrived.

DNIS: Dialed Number Identification Service identifies the telephone number dialed by the caller to reach the incoming line. It is used when the same incoming line has more than one telephone number and is a service of the telephone carrier.

CLID: Calling Line Identification identifies the telephone number from which the caller is placing the call. Its delivery is a service of the telephone carrier, and may be received when the call arrives, or requested while the call is in progress.

DIALED: The dialed field contains digits dialed by the caller in response to voice prompts after the call has been answered. It may also contain additional digits, such as a customer account number obtained by querying a customer database.

Each field name (BRI, DNIS, CLID, DIALED) is associated with a field table (FT). The collection of all field tables is machine readable call discriminator table 40. An FT has two parts: a global to local application table (GLAT) and a field matrix (FM). The GLAT is explained below. The FM has 11 columns (one for each digit 0, 1, 2 ... 9, and a special column for unspecified digits). The FM has one row for each digit position in the field; for example, CLID has 10 digits and its FT has 10 rows, while DNIS has 4 digits, and its FT has only 4 rows. Each entry in the FM consists of the set of application programs which can have that digit value (represented by the column) in that position (represented by the row). These sets are generated automatically by call discriminator translator module 46, from the list of applications and digit patterns provided by the user. Typically, each of these sets has more than one element.

Translator module 46 includes grammar to translate any user program written in that grammar into machine readable call discriminator table 40. A name in brackets (<name>) denotes a placeholder for an arbitrary name, and a name not in brackets must be entered literally. The syntax for the grammar is

```
<application name> application
    <list of initial attributes>
pattern
    BRI:     <list of patterns>
    DNIS:    <list of patterns>
    CLID:    <list of patterns>
    DIALED:  <list of patterns>
match
```

The list of initial attributes, which is optional, can specify a particular agent or a high or low priority when queuing before agent pools. Not all the fields (BRI, CLID, DNIS, DIALED) need to be entered, and they may appear in any order. Also, the patterns can include capital letters representing telephone digits (A-P, R-Y); e.g., 3xx USA 123x could be a valid pattern. A list of patterns is of the form

```
<combination of digits, letter x, spaces>
n
<combination of digits, letter x, spaces>
n
.
.
.
```

\n stands for the new line character (carriage return); x stands for any digit 0, 1, 2 ... 9. Spaces in the pattern are ignored. The following is an example of a pattern list including ten digit telephone numbers:

```
617 466 xxxx
305 xxx xxxx
415 xxx xxxx
```

The first entry specifies all phone numbers in the 617 area code and 466 local exchange. The second and third entries include all phone numbers in the 305 and 415 area codes.

Translator module 46 interprets each new line character as a logical OR operation, and each appearance of a field name as a logical AND operation. This is implemented by adding, for each pattern in a pattern list, a new local application index (for the corresponding field, and matched to the global application in which the pattern appears). For each digit in the pattern, that local application index is added to the sets in the field matrix.

An automated software tool, known in the art as "yacc", is employed to generate a C program used in translator module 46 from the grammar described above and fragments of C program code (not complete programs or subroutines), according to established techniques in computer science, as described in, e.g., Aho, Sethi, Ullman, *Compilers: Principles, Techniques and Tools*, (Addison-Wesley, 1986) and Unix System V.3.2/386 Programmer's Guide, Volume, Chapter 6, AT&T,(1988) and as available in the Unix V.3.2/386 operating system. The output of yacc is a C program that translates the digit patterns input by the system manager according to the grammar into an output language specified by the fragments of C code given to yacc; the output language here is call discriminator table 40.

An example with two application programs is described here to illustrate the use of the call discrimination subsystem. The systems operator wishes to classify as sales calls all arriving calls that are received on lines 20-29, and which are dialed as either 8.00 USA 1234 or as 800 USA 2222. The operator also wishes to classify as service all calls that arrived on lines 10-30 and which were dialed as 800 USA 1230-1239. The patterns entered by the user at interactive input device 44 are shown below with line numbers in parentheses.

```
(1)  sales application
(2)  pattern
(3)       BRI:      2x
(4)       DNIS:     2222
(5)                 1234
(6)  match
(7)  service application
(8)  pattern
(9)       BRI:      1X
(10)                2x
(11)                30
(12)      DNIS:     123x
(13) match
```

Translator module 46 reads this description and creates call discriminator table 40, creating and expanding as necessary the following tables as each line is read: global index to name table (which lists a global index for each named application program), BRI table, and DNIS table. The BRI and DNIS tables each have a local to global translation table (which lists a local application index for each digit pattern entered in a field) and a field matrix (as described above).

| line 1: | global to name table: | | | | | |
|---|---|---|---|---|---|---|
| | global | name | | | | |
| | 0 | sales | | | | |
| line 3: | BRI table: | | | | | |
| | local to global table: | | | | | |
| | global | local | | | | |
| | 0 | 0 | | | | |
| | field matrix: | | | | | |
| digit: | 0 | 1 | 2 | 3 | 4 | 5... |
| | | | {0} | | | |
| | {0} | {0} | {0} | {0} | {0} | {0} |
| line 4: | DNIS table: | | | | | |
| | local to global table | | | | | |
| | global | local | | | | |
| | 0 | 0 | | | | |
| | field matrix: | | | | | |
| digit: | 0 | 1 | 2 | 3 | 4 | 5... |
| | | | {0} | | | |
| | | | {0} | | | |
| line 5: | DNIS table: | | | | | |
| | local to global table | | | | | |
| | global | local | | | | |
| | 0 | 0 | | | | |
| | 0 | 1 | | | | |
| | field matrix: | | | | | |
| digit: | 0 | 1 | 2 | 3 | 4 | 5... |
| | | {1} | {0} | | | |
| | | | {0,1} | | | |
| | | | {0} | {1} | | |
| | | | {0} | | {1} | |
| line 7: | global to name table | | | | | |
| | global | name | | | | |
| | 0 | sales | | | | |
| | 1 | service | | | | |
| line 9: | BRI table: | | | | | |
| | local to global table | | | | | |
| | global | local | | | | |
| | 0 | 0 | | | | |
| | 1 | 1 | | | | |
| | field matrix: | | | | | |
| digit: | 0 | 1 | 2 | 3 | 4 | 5... |
| | | {1} | {0} | | | |
| | {0,1} | {0,1} | {0,1} | {0,1} | {0,1} | {0,1} |
| line 10: | BRI table: | | | | | |
| | local to global table: | | | | | |
| | global | local | | | | |
| | 0 | 0 | | | | |
| | 1 | 1 | | | | |
| | 1 | 2 | | | | |
| | field matrix: | | | | | |
| digit: | 0 | 1 | 2 | 3 | 4 | 5... |
| | | {1} | {0,2} | | | |
| | {0,1,2} | {0,1,2} | {0,1,2} | {0,1,2} | {0,1,2} | {0,1,2} |
| line 11: | BRI table: | | | | | |
| | local to global table: | | | | | |
| | global | local | | | | |
| | 0 | 0 | | | | |
| | 1 | 1 | | | | |
| | 1 | 2 | | | | |
| | 1 | 3 | | | | |
| | field matrix: | | | | | |
| digit: | 0 | 1 | 2 | 3 | 4 | 5... |
| | | {1} | {0,2} | {3} | | |
| | {0,1,2,3} | {0,1,2} | {0,1,2} | {0,1,2} | {0,1,2} | {0,1,2} |
| line 12: | DNIS table: | | | | | |
| | local to global table: | | | | | |
| | global | local | | | | |
| | 0 | 0 | | | | |
| | 0 | 1 | | | | |
| | 1 | 2 | | | | |
| | field matrix: | | | | | |
| digit: | 0 | 1 | 2 | 3 | 4 | 5... |
| | | {1,2} | {0} | {3} | | |
| | | | {0,1,2} | | | |
| | | | {0} | {1,2} | | |
| | {2} | {2} | {0,2} | {2} | {1,2} | {2} |

After line 13 has been read, the translation is complete, and the final tables are: the global to name table from line 7, the BRI table from line 11, and the DNIS table from line 12. These tables are transmitted to call router 18 and stored as call discriminator table 40 for access by call discriminator 38.

When an incoming call needs to be assigned an application program, call discriminator 38 compares the telephony information associated with the incoming call with the digit patterns entered by the system manager for the candidate application programs. This is done by traversing call discriminator table 40 on a digit-by-digit basis for the telephony information, excluding an application program from the set of candidate application programs when the requirements for an associated field have not been met.

For example, assume a caller dials 800 USA 1230; the call arrives on line 25, and the call discriminator table 40 described above is used. The call's candidate set is set initially to all the application programs. Using global indices, this set is {0,1}. The call data are BRI: 25, DNIS: 1230.

First, the BRI table is traversed. The candidate set is translated to local applications, using the final BRI local to global table (after translating line 11 above), and becomes {0, 1, 2, 3}. The BRI digit at the first digit position is 2, and the candidate set is replaced by its intersection with the set in the first row (corresponding to first digit position) of the BRI field matrix, under digit 2, giving a new candidate set $${0,2} = {0,1,2,3} \cap {0,2}$$

(In this notation the new candidate set is to the left of the = sign; the old candidate set is the first entry to the right of the = sign, and the set in the field matrix is the second entry to the right.) The second BRI digit is 5, so the candidate set is intersected with the set in the second row under digit 5, and becomes $${0,2} = {0,2} \cap {0,1,2}$$

This ends the traversal of the BRI table; converting from local to global indices (using the final local to global table after translating line 11), the candidate set becomes {0,1 }. Thus, on the basis of BRI value alone, the application program may be either application 0, sales, or application 1, service.

Traversing the DNIS table, the candidate set is initially, in local indices (from the DNIS table after translating line 12), {0,1,2}. Traversing the DNIS digits 1230, the candidate set (in local indices) becomes successively,

| {1,2} | = | {0,1,2} | ∩ {1,2} |
| {1,2} | = | {1,2} | ∩ {0,1,2} |
| {1,2} | = | {1,2} | ∩ {1,2} |
| {2} | = | {1,2} | ∩ {2} |

Hence, the call belongs to local application 2, which translates to global application 1, service.

If more than one application program remains in the candidate set after traversing call router table 40, of the remaining application programs, the one that was entered last by the system manager is selected. If no application program remains, a default program is selected.

The candidate sets and sets in the field matrices are represented as bit patterns, and each element of the set is represented by a bit turned on in the set. The intersection of two sets is the logical AND of two bit patterns, an extremely fast machine operation, resulting in fast execution time for the call discrimination procedure.

After an application program has been selected, routing interpreter 34 continues processing handling of the incoming call according to that application program. Call discriminator 38 can be recalled from an application program after more information has been obtained about the call. An application program that does not have the DIALED field may direct a call to voice response unit 25, which then asks the caller to enter digits in response to prompts and then returns control to call discriminator 38 to traverse field table 40 once again, this time with digits in the DIALED field, now permitting a match with an application program that has digit patterns for the DIALED field. No incoming call would ever be transferred directly to an application program having digit patterns for the DIALED field. An advantage of the invention is that it allows a refinement of the call discrimination (separating calls on the basis of the dialed digits in the example above) by simply listing more applications and patterns, without the need for user programming in the call processing programs.

The call discrimination subsystem allows the system manager to specify digit patterns for the various fields in many combinations in order to make fine distinctions between different calls and to process the calls differently.

AGENT SELECTOR MECHANISM

Agent selector mechanism 36 maintains lists of quantitative agent selection values that are used to select which agent of a plurality of available agents is to receive an incoming call. A plurality of quantitative values relating to different criteria are maintained for each agent. A criterion can be static or dynamic. An example of a static criterion is an agent rank assigned by an agent supervisor. Examples of dynamic criteria, which are updated automatically by the system, are:

amount of time the agent has been ready to receive calls, total sales by the agent, and average time to handle a call.

The static and dynamic values are maintained in associated fields in agent selector mechanism 36. The supervisor of an agent pool at agent supervisor station 24 or the system manager at console 20 selects which of the four fields (i.e., agent rank and the three dynamic fields just mentioned) will be used to rank agents. Each of these fields has an associated offset value for each agent that has been set statically by the agent supervisor. Every time the agent completes a call, or becomes ready, the dynamic fields are updated by state manager 30. An effective selection value is calculated by subtracting the field offset from the current selected field value. As agents become ready, they are ordered in increasing effective field value, and a call queued for that agent pool is given to the ready agent at the head of the queue (highest effective value of the selected field).

FIG. 4 shows field and offset values for four hypothetical agents A, B, C, D. The agent supervisor has assigned the quantitative ranks listed in the third row and an offset value of 500 for the total sales field for agent C and an offset of 2 for the calls per hour field for agent D. The field values for availability (i.e., the time that the agent has been waiting in the available state ready to receive a call), total sales for a given period (e.g., that day), and calls per hour are continuously updated by state manager 32 as new information is made available to it. Which agent is selected to receive the next call depends upon which field has been selected by the agent supervisor, as is shown in FIG. 5. If the availability field is selected, agent C receives the first call, agent A the second call, and so on. If the sales field is selected, agent A receives the first call, agent B the second, and agent C the third, even though agent C has higher total sales, because agent C's offset gives it an effective value that is less than that of agent A and agent B.

If an agent supervisor wishes to give the next call to the agent with the highest sales, he sets all the offsets (for total sales) to 0 and selects total sales as the field.

When introducing a trainee agent into such an agent pool, the supervisor would probably set the trainee agent's offset to a large positive value. The trainee agent will have a lower effective field value than a normal agent in the same pool with the same sales, because the trainee agent has a non-zero offset. The number of calls the trainee agent is offered could be increased gradually by decrementing the offset gradually.

FIG. 6 lists ranking criterion and offsets that could be selected depending upon whether the agents are in sales, service or support pools. The agent selector mechanism thus allows agents in an agent pool to be assigned calls based on a user defined criterion, permitting a supervisor to affect agent selection in a way that is designed to promote performance or meeting other call center objectives. The offset feature permits the supervisor to fine tune the system based upon the unique characteristics of the individual agents in the agent pool.

BEFORE/AFTER MECHANISM

5 The before/after mechanism is used to specify actions to be taken before and after actual handling of a call by an agent. It is implemented as an integral part of routing interpreter 34 that is configured by the system manager using a simplified language. The mechanism is employed during running of an application program prior to agent selection to identify what actions are to be taken. Pointers to lists of instructions for the actions are placed in the call record for a call at the time of assigning an agent pool, and the identified actions are then executed after the selection of an agent. The specified actions can be different for each agent pool before which the call is queued, and are triggered only if the call is transferred to an agent in the corresponding pool.

The before mechanism causes a list of user specified instructions to be executed just prior to transferring a call to an agent. The following is an example of a program fragment (written in the simplified call processing language used at interface 44) that implements the before mechanism:

| AddAgentPool before | SALES1 |
| --- | --- |
| | DumpCallData; SupervisorMonitor; |
| done; AddAgentPool before | SALES2 |
| | ChangeAgentScreen; |
| done; | |

It has the following effect: an incoming call is queued before the SALES1 and the SALES2 agent pools. If an agent in SALES1 becomes ready to take the call, first, the call data are delivered to a host database (the DumpCallData statement); second, the agent's supervisor is directed to monitor the agent (SupervisorMonitor statement), and, third, the call is connected to the agent in SALES1. However, if it is an agent in SALES2 that becomes ready to take the call then, first, the agent's screen is changed, and, second, the call is connected to the agent.

The after mechanism causes a list of user specified instructions to be executed after a call has been released by the agent. The following is an example of a program fragment that implements the after mechanism:

| AddAgentPool after | SALES1 |
| --- | --- |
| | ChangeAgentScreen; |
| done; AddAgentPool after | SALES2 |
| | SupervisorMonitor |
| done; | |

It has the following effect: an incoming call is queued before the agent pools SALES1 and SALES2. If the call is answered by an agent in SALES1, then, after the call has been released by the agent, the agent's screen is modified. If the call is answered by an agent in SALES2, then, after the call has been released by the agent, the agent is monitored by a supervisor.

FIG. 7 shows the effect that the before/after mechanism has on call handling as seen by the agent. The first screen shows the screen when an agent in the SALES1 agent pool is ready for a call. After a call has been assigned to this agent and before it is actually transferred to him, the DumpCallData command of the before mechanism results in call information (e.g., from a customer file) appearing on the screen at that agent station 14. After the call has been released by the agent, the after mechanism executes the ChangeAgentScreen command, resulting in the last screen on FIG. 7, used, e.g., to enter follow-up information about a call before going into the ready state to take another call. The before/after mechanism thus permits the system manager to easily configure the system to automatically change the way that an agent station operates depending on what application program is employed and what pool of agents receives the call.

As is mentioned above, the before/after mechanism is implemented using a stack of pointers to instruction lists in routing table 37. The statement:

| AddAgentPool | <name> |
| --- | --- |
| before | <list1> done |
| after | <list2> done, | entered by the agent supervisor or system manager, is transformed into the stack:

| pointer to start of | <list1> | top of stack |
| --- | --- | --- |
| connect to agent in | <name> | |
| pointer to start of | <list2> | |
| STOP | | bottom of stack |

This stack is inserted into the call record for the incoming call, and is associated both with the call and the agent pool (identified by name) before which it is queued. If an agent in the pool becomes ready to take the call, the agent's identifier is inserted in the middle statement (connect to agent in <name>), and the stack of instructions is executed, beginning at the top. When <list1> (the before list) has been executed, the next statement is connect to agent, which effects the transfer of the call to the agent. When the call is released (i.e., after the agent and caller have been disconnected from each other), that statement is deemed to have been completed, and the rest of the stack (<list2>, the after list of statements) is executed. FIGS. 8-10 show the before/after statements (FIG. 8), the resulting stack of pointers (FIG. 9) to implement the statements, and a flow chart (FIG. 10) for executing the instructions indicated by the stack of pointers for before commands b1-bn and after commands a1-an.

This approach also allows nested before and after statements (before and after clauses in <list1>, <list2> which are implemented by normal stack operations).

Some additional examples of actions that are user configurable employing the before mechanism are described below. In these examples, the call is queued, successively, before agent pools SALES 1 and SALES2. Comparable applications are possible using the after mechanism.

1) Allowing a supervisor group to monitor all the calls answered by a SALES1 agent:

```
AddAgentPool        SALES1
   before SupervisorMonitor;
   done;
AddAgentPool        SALES2
```

2) Allowing a supervisor group to monitor 1% of all the calls answered by a SALES1 agent;

```
AddAgentPool    SALES1
   before
                sample 100 do SupervisorMonitor done;
   done;
AddAgentPool    SALES2
```

3) Playing an agent specific recording to the caller just before the call is answered by an agent in the pool:

```
AddAgentPool        SALES1
   before
      play          SALES1_REC;
   done;
AddAgentPool        SALES2;
   before
                    play SALES2_REC;
   done;
```

4) Connecting any agent that answers a call to an external database, with customer information from the database appearing on the agent screen:

```
AddAgentPool        SALES1
   before
                    DumpCallData;
   done;
AddAgentPool        SALES2
   before
                    DumpCallData;
   done;
```

Example 2 illustrates the ability of call router 18 to count the number of incoming calls and to handle a portion of the total number of calls by a different method than the remainder of the calls. In Example 2, for 1% of the incoming calls, the agent supervisor is connected to listen to a conversation between an agent and a caller. Alternatively, the agent supervisor could be selected as the agent to receive an incoming call in order to determine the types of incoming calls. Instead of counting all incoming calls, the call router could count calls that have reached a specified step in the call handling process, e.g., calls that have waited 45 seconds. The sample capability could also be used to play different messages to different incoming callers to evaluate the effectiveness of the messages.

OTHER EMBODIMENTS

Other embodiments of the invention are within the scope of the following claims.

What is claimed is:

1. A system for automatically handling incoming telephone calls comprising
    means for receiving an incoming call arriving at an incoming line,
    means for receiving telephony information about said incoming call,
    means for assigning said incoming call to be controlled by one of a plurality of possible application programs based upon said information, each said application program including a set of user defined steps for handling an incoming call, said means for assigning including a call discrimination subsystem that is separate and distinct from said application programs,
    at least one of said application programs including queries for obtaining further information about said call, and
    means for returning control of said incoming call to said call distribution subsystem when said incoming call is controlled by said at least one application program and said at least one application program obtains said further information, said call discrimination subsystem reassigning said call to be controlled by one of a plurality of possible application programs based upon said telephony information and said further information.

2. The system of claim 1 wherein said means for receiving receives incoming calls arriving at one of a plurality of incoming lines, and said call discrimination subsystem is used to assign incoming calls for said plurality of incoming lines.

3. The system of claim 1 wherein said at least one application program includes queries for obtaining said further information from a storage means containing information relating to said incoming call.

4. The system of claim 3 wherein said storage means includes customer filers, and said further information is obtained from said customer files.

5. The system of claim 3 wherein said storage means is an external database.

6. The system of claim 3 wherein said storage means is a host database.

7. A system for automatically handling incoming telephone calls comprising
    means for receiving an incoming call arriving at an incoming line,
    means for receiving telephony information about said incoming call,
    means for assigning said incoming call to be controlled by one of a plurality of possible application programs based upon said telephony information, each said application program including a set of user defined steps for handling an incoming call, said means for assigning including a call discrimination subsystem that is separate and distinct from said application programs, and
    input means for a user to enter telephony digit patterns that are associated with respective said application programs, said digit patterns including patterns for plural fields corresponding to different types of telephony information, wherein said call discrimination subsystem compares said telephony information with said digit patterns when assigning said incoming call.

8. The system of claim 7 wherein said fields include a calling line identification field and a dialed number field.

9. The system of claim 7 wherein said call discrimination subsystem includes a translation module that translates said patterns into assignment logic for assigning said incoming calls, said translation module treating all patterns within the same field as logical OR operations and patterns in different fields as logical AND operations in creating said assignment logic.

10. The system of claim 9 wherein said assignment logic created by said translation module includes a global name table that lists a global application index (GAI) for each possible application program, a global-to-local application table (GLAT) for each field, and a field matrix (FM) for each field, said GLAT matching each GAI to local application indexes (LAI) that each identify a telephony pattern associated with one of said application programs, said FM including pattern digit values along one axis and pattern digit positions along another axis and sets of LAI values at the intersections of digit values and digit positions.

11. The system of claim 10 wherein said call discrimination subsystem assigns an incoming call by establishing an initial global candidate set (GCS) of possible application programs that includes all GAIs and thereafter traversing said FMs for each field, the traversing for each field including first establishing a local candidate set (LCS) for each field that includes all LAIs in the respective GLAT and thereafter replacing said LCS with the intersection of the LCS with the LAIs in the FM at locations in the FM corresponding to digits in the field of the incoming call, the GCS being replaced with the intersection of the GCS with the GAIs associated with LAIs remaining at the completion of the traversal of each FM.

12. The system of claim 11 wherein said traversing of said FMs includes comparing the value of each digit of a field one digit position at a time and replacing the LCS with the intersection of the LCS with the LAIs located at the corresponding digit value and digit position in the FM.

13. The system of claim 12 wherein, if more than one GAI remain in said GCS after the completion of traversing of said FMs, then said discrimination or subsystem selects the last GAI remaining in said GCS.

14. The system of claim 13 wherein said call discriminator subsystem selects a default GAI if no GAI remains in said GCS after the completion of traversing of said FMs.

15. The system of claim 11 wherein said receiving means inserts unspecified digits (U) into the telephony information for an incoming call when the incoming call does not have associated telephony information for a field.

16. The system of claim 7 wherein said fields include an incoming line identification field.

17. The system of claim 7 wherein said input means includes means for a user to enter caller response digit patterns that are associated with respective said application programs, and said call discrimination subsystem also compares caller response information with said caller response digit patterns when assigning said incoming call.

18. The system of claim 17 wherein said caller response digit patterns identify an account number and said account number is used to obtain said further information from a storage means.

19. The system of claim 12 wherein said input means includes means for a user to enter caller response digit patterns that are associated with respective said application programs, and wherein said transistors module creates a GLAT and an FM for a caller response field, and said call discrimination subsystem also compares caller response information with said caller response digit patterns when assigning said incoming call.

20. The system of claim 19 wherein at least one of said application programs includes queries for obtaining said caller response information and means for thereafter returning control to said call discrimination subsystem to reassign said incoming call based upon said telephony information and said caller response information.

21. A system for automatically handling incoming telephone calls comprising means for receiving an incoming call, means for maintaining a list of quantitative agent performance values for possible agents for receiving said incoming call, said agent performance values relating to the performance of respective, individual said agents in achieving performance goals relating to success of a business, input means for a user to enter data describing the success of an agent in achieving said business performance goals on incoming calls, means for monitoring respective performances of said individual agents based upon said data describing success and updating said performance values, and means for selecting one of said possible agents to receive said incoming call based upon said performance values.

22. The system of claim 21 wherein said means for monitoring monitors total sales by each agent, and said list is a list of total sales made by each agent.

23. A system for automatically handling incoming telephone calls comprising means for receiving an incoming call, means for maintaining a list of quantitative agent selection values for possible agents for receiving said incoming call, said quantitative agent selection values relating to respective, individual said agents, means for modifying said selection values for individual agents based upon respective offset values assigned to said agent selection values, and means for selecting one of said possible agents to receive said incoming call based upon said selection values in the list.

24. A system for automatically handling incoming telephone calls comprising means for receiving an incoming call, means for maintaining a plurality of lists of quantitative agent selection values for possible agents for receiving said incoming call, said quantitative agent selection values relating to respective, individual said agents, each said list corresponding to a different criteria of agent selection, input means for a user to select which said list is to be employed in selecting an agent for said call, and means for selecting one of said possible agents to receive said incoming call based upon said selection values in the list selected via said input means.

25. The system of claim 24 wherein said lists include a total sales list that lists the total sales made by each agent.

26. The system of claim 24 wherein said lists include a call time list that lists the average time to handle a call by each agent.

27. The system of claim 24 wherein said lists include an agent rank list that lists an agent performance rank assigned to each agent.

28. The system of claim 24 wherein said lists include a waiting time list indicating the amount of time that each agent has been ready to receive a call.

29. A system for automatically handling incoming telephone calls comprising
   means for receiving an incoming call,
   means for selecting one agent of a plurality of possible agents to receive said incoming call, said means including queuing before a plurality of agents and selecting an agent of said plurality after said agent becomes available, and
   means for providing one command of a plurality of possible user defined commands regarding how said incoming call is handled apart from the routing to said agent, the selection of said one command being dependent upon which agent has been selected.

30. The system of claim 29 wherein said commands include a command to play a message to the caller prior to connecting the incoming call to said one agent.

31. The system of claim 29 wherein said commands include a command to communicate with an agent supervisor regarding said incoming call.

32. The system of claim 29 wherein said commands include a command to obtain information from an external database and send said information to said one agent prior to connecting said incoming call to said one agent.

33. The system of claim 29 wherein said commands include a command to take some action after said incoming call has been disconnected from said agent.

34. The system of claim 29 further comprising user input means for a user to enter commands that are to be employed for respective said agents.

35. The system of claim 38 wherein said input means includes means to input a list of agent pool identifiers and actions to be taken before connecting the incoming call to an agent in the indicated pool and actions to be taken after the incoming call has been disconnected from the agent in the indicated pool, and said system further comprises means to translate said list into a list of pointers to instruction lists to provide said commands to cause the indicated actions.

36. The system of claim 35 wherein said lists of pointers include a pointer to instructions to connect to an agent in a particular pool.

37. The system of claim 36 wherein said pointer is changed to identify a particular agent after said one agent has been selected.

38. The system of claim 29 further comprising means for counting the number of incoming calls and, for a preselected number of incoming calls that is smaller than the total number of incoming calls, provide a command for handling the smaller number of incoming calls in a different manner than the remainder of the incoming calls.

39. The system of claim 29 further comprising means for counting the number of incoming calls that have reached a specified step in the handling of said incoming calls and, for a preselected number of incoming calls that have reached said specified step that is less than the total number of incoming calls reaching said specified step, handling the smaller number of incoming calls in a different manner.

40. The system of claim 28 wherein said handling in a different manner includes communicating with an agent supervisor regarding an incoming call.

41. The system of claim 40 wherein said agent supervisor is connected to listen to a conversion between said one agent and a caller making said incoming call.

42. The system of claim 40 wherein said agent supervisor is selected as said one agent to receive said incoming call.

43. The system of claim 38 wherein said handling in a different manner includes playing a message that is not played during handling of the other incoming calls.

44. A system for automatically handling incoming telephone calls comprising
   means for receiving an incoming call,
   means for selecting one agent of a plurality of possible agents to receive said incoming call,
   means for providing a command regarding the handling of said incoming call, and
   means for counting the number of incoming calls in order to select a percentage of incoming calls out of the total number of incoming calls and for providing a command for handling the selected percentage of incoming calls in a different manner than the remainder of the incoming calls.

45. The method of claim 44 wherein said handling in a different manner includes communicating with an agent supervisor regarding an incoming call.

46. The system of claim 45 wherein said agent supervisor is connected to listen to a conversion between said one agent and a caller making said incoming call.

47. The system of claim 45 wherein said agent supervisor is selected as said one agent to receive said incoming cell.

48. The method of claim 44 wherein said handling in a different manner includes playing a message that is not played during handling of the other incoming calls.

49. A system for automatically handling incoming telephone calls comprising
   means for receiving an incoming call,
   means for selecting one agent of a plurality of possible agents to receive said incoming call,
   means for providing a command regarding the handling of said incoming call, and
   means for counting the number of incoming calls that have reached a specified step in the handling of said incoming calls in order to select a percentage of incoming calls out of the total number of incoming calls that have reached said specified step and for providing a command for handling the selected percentage of incoming calls in a different manner than the remainder of the incoming calls.

* * * * *

UNITED STATES PATENT AND TRADEMARK OFFICE
CERTIFICATE OF CORRECTION

PATENT NO. : 5,299,260

DATED : March 29, 1994

INVENTOR(S) : Jack Shaio

It is certified that error appears in the above-identified patent and that said Letters Patent is hereby corrected as shown below:

Col. 6, line 41, after ">", insert --/n--.
     line 42, delete "n".
     line 43, after ">", insert --/n--.
     line 44, delete "n".

Col. 7, line 23, "8.00" should be --800--.

Col. 11, line 22, delete "5".

Col. 13, line 15, "oalls" should be --calls--.

Col. 14, Claim 4, line 45, "filers" should be --files--.

Col. 16, Claim 20, line 17, after "call", insert --to be controlled by one of a plurality of possible application programs--.

Col. 17, Claim 35, line 44, "38" should be --34--.

UNITED STATES PATENT AND TRADEMARK OFFICE
CERTIFICATE OF CORRECTION

PATENT NO. : 5,299,260
DATED : March 29, 1994
INVENTOR(S) : Jack Shaio

It is certified that error appears in the above-indentified patent and that said Letters Patent is hereby corrected as shown below:

Col. 18, Claim 40, line 11, "28" should be --38--.
     Claim 47, line 44, "cell" should be --call--.

Signed and Sealed this

Fifth Day of December, 1995

Attest:

BRUCE LEHMAN

Attesting Officer     Commissioner of Patents and Trademarks